Jan. 27, 1942. C. H. GRAESSER ET AL 2,271,423
DIAL INSTRUMENT CASE
Filed Aug. 14, 1940 3 Sheets-Sheet 1
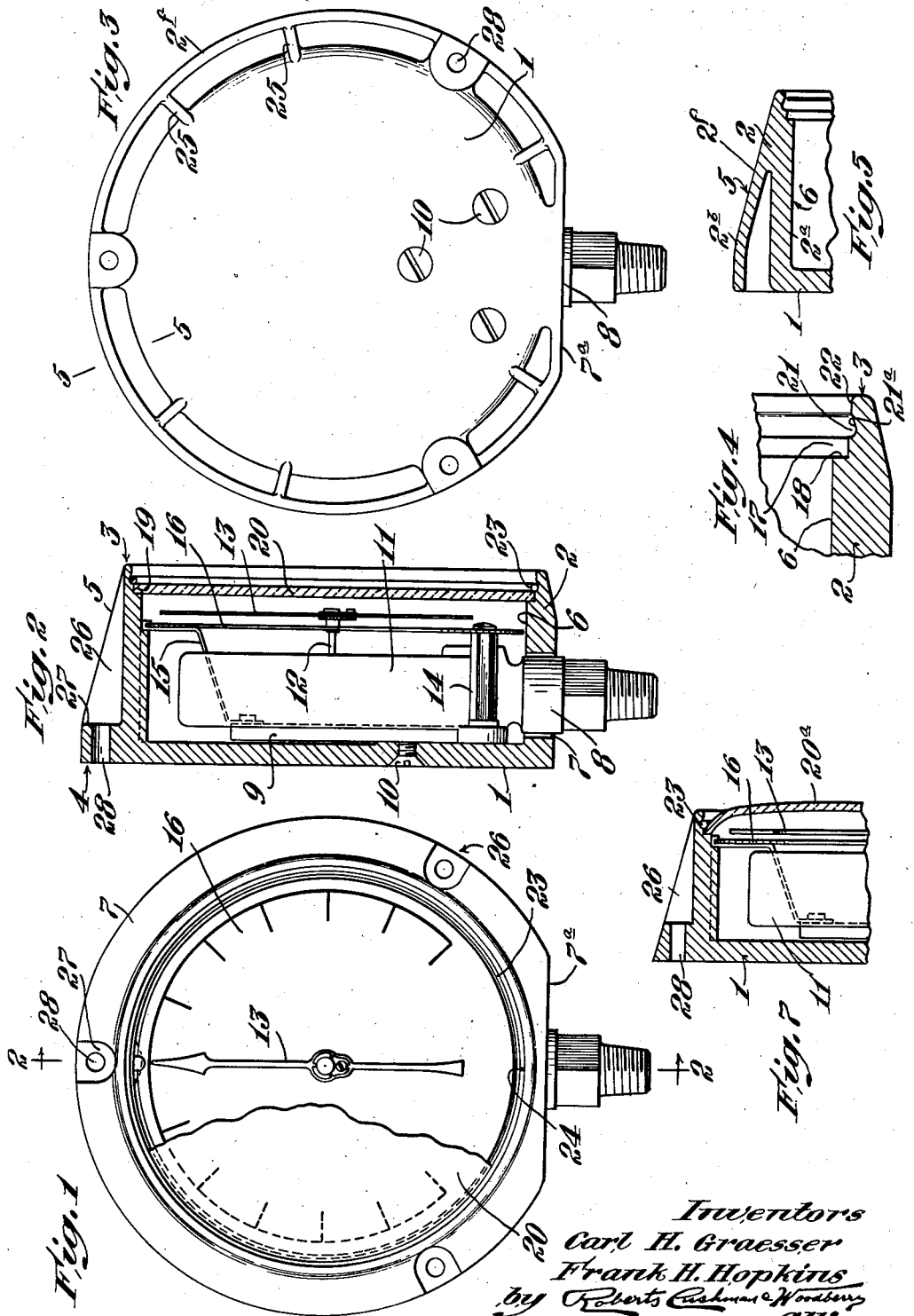
Inventors
Carl H. Graesser
Frank H. Hopkins
by Roberts Cushman Woodbury
Att'ys.

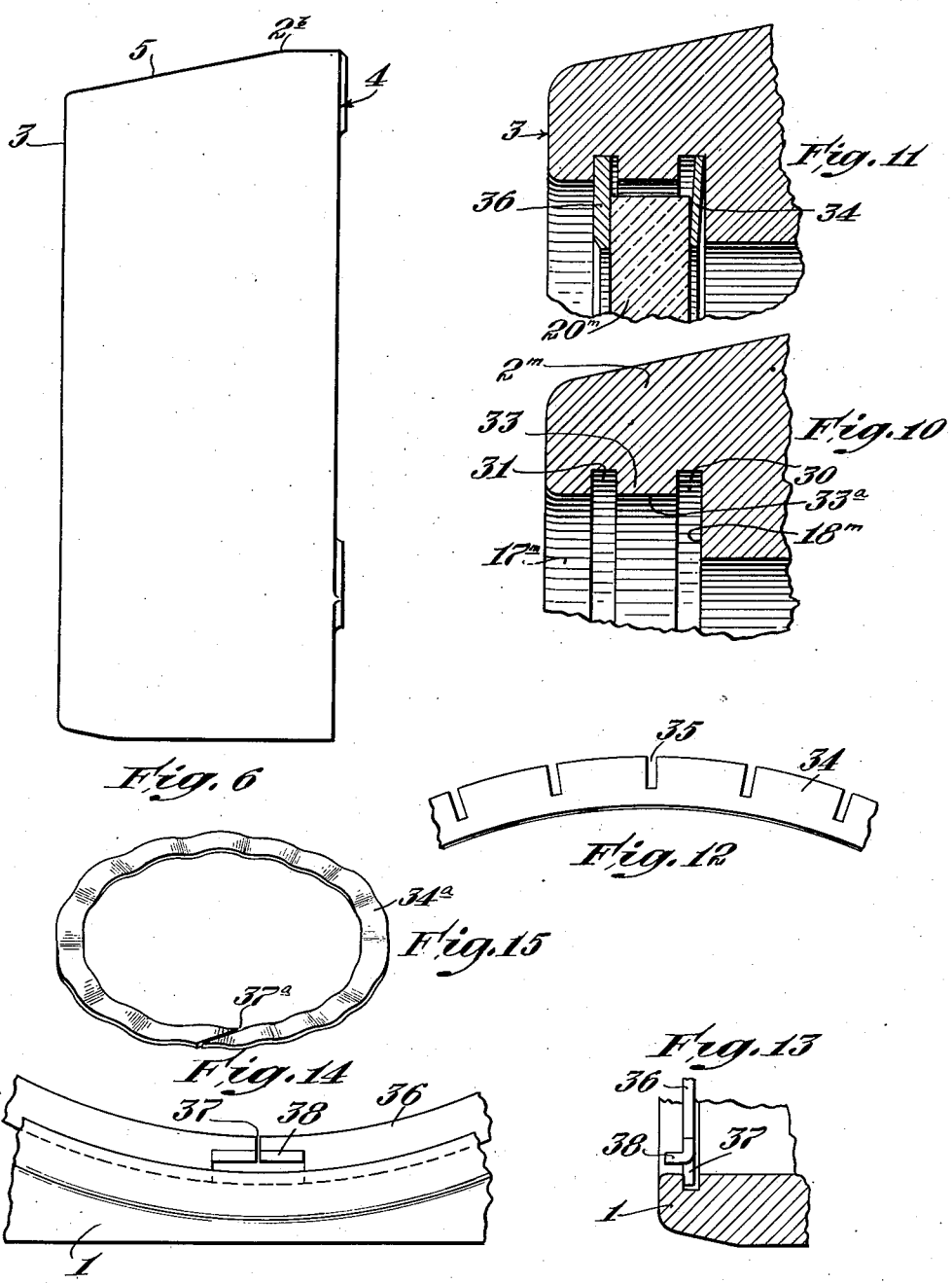

Jan. 27, 1942.         C. H. GRAESSER ET AL         2,271,423
                       DIAL INSTRUMENT CASE
                       Filed Aug. 14, 1940           3 Sheets-Sheet 3
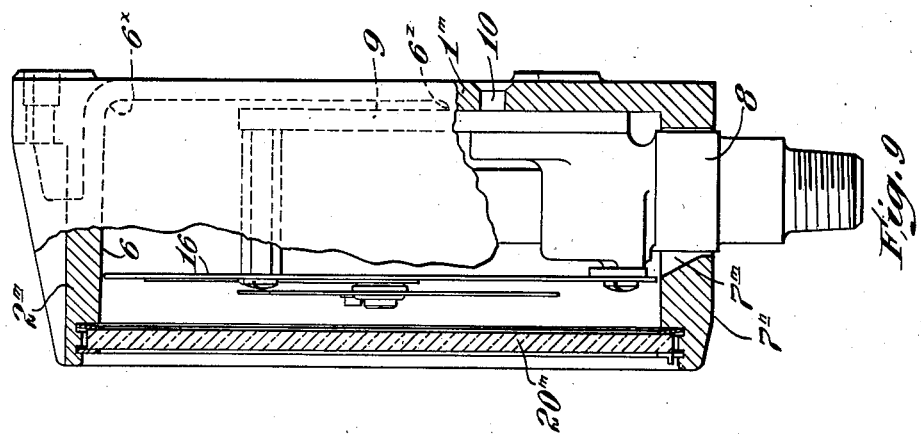
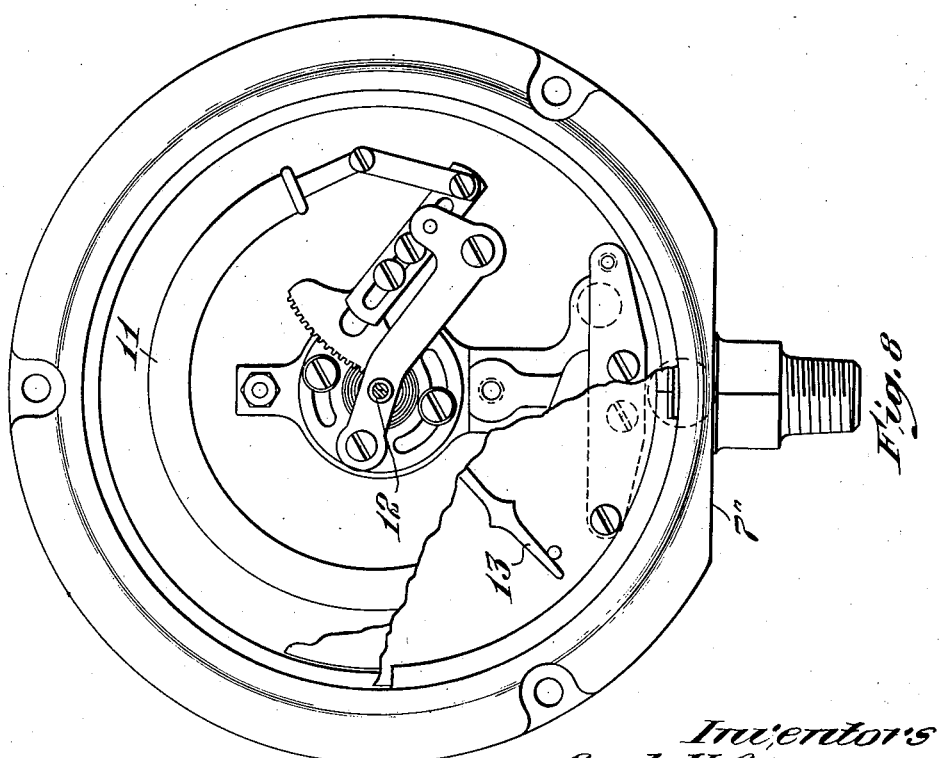
Inventors
Carl H. Graesser
Frank H. Hopkins
by Roberts Cushman & Woodberry
Attys.

Patented Jan. 27, 1942

2,271,423

UNITED STATES PATENT OFFICE 2,271,423

DIAL INSTRUMENT CASE

Carl H. Graesser, Bridgeport, and Frank H. Hopkins, Fairfield, Conn., assignors to Manning, Maxwell & Moore, Incorporated, New York, N. Y., a corporation of New Jersey Application August 14, 1940, Serial No. 352,538

5 Claims. (Cl. 73—151)

This invention relates to pressure gauges, dial thermometers, or instruments of generally similar construction wherein a pointer or index is moved over a graduated dial by mechanism housed within a protective casing, the latter having a removable transparent front panel, and relates more especially to a novel form of case for such instruments.

In accordance with usual prior practice the gauge case is a substantially cylindrical metal box, usually having a thin, integral, radial attaching flange at its rear end and having screw threads at its forward end for engagement by screw threads formed upon an annulus designed to be removably secured by such screw threads to the case proper, and which constitutes a portion of the closure cap which covers and protects the dial and pointer. Usually, the cap includes a transparent panel of glass or the like fixed within the annulus by means of a screw-threaded ring which fits within the annulus and presses the glass firmly against a radial shoulder of the annulus. To provide this shoulder and to furnish a good bearing for the glass, the annulus usually has a radial flange of substantial width whose inner edge defines the sight opening through which the dial may be viewed. Since this flange is of substantial width, for example three-eighths of an inch or more, the sight opening is of substantially less diameter than the interior of the case and thus, even though the dial be of the maximum diameter which will fit within the case, the effective area of the dial is very substantially reduced by the flange of the cap.

As noted, gauge cases have customarily been made of metal, for instance steel or brass, but some of the more recently developed plastic materials, for instance some of the synthetic resins, have properties (for instance, ease of moulding to exact shape, lightness of weight, resistance to corrosion, fine appearance, etc.) which recommend them for use in making gauge cases. However, such materials are not as strong as metal and if moulded to the same dimensions as the usual metal case, the attaching flange and cap annulus would not be strong enough to withstand the stresses of use. Thus, heretofore, in designing gauge cases to be made from such material, it has been thought necessary to make certain parts at least of the case, for example the attaching flange and the cap annulus, of substantially greater dimensions than when these parts are made of metal. However, this imparts a clumsy appearance to the gauge, requires an abnormal amount of a relatively expensive material, and, as respects the cap annulus, requires the radial flange to be of even greater depth than usual, thus cutting off still more of the effective area of the dial.

The closure cap is usually designed for removal from the case to facilitate inspection or recalibration of the gauge mechanism. However, when the case and the bezel which holds the transparent panel are both of metal, they are subject to corrosion or rusting so that removal may become difficult or impossible; if the case and the bezel portion of the cap are both moulded from non-metallic material, it is difficult so to mould them as to provide proper tolerances or to prevent subsequent plastic flow of the material, thus making it difficult to assemble the parts or to separate them.

The principal object of the present invention is to provide a gauge case of such shape and construction that substantially the entire dial is exposed to view; to provide a gauge case which may be made, for example, from one of the plastic non-metals but which will have adequate strength to withstand distortion by reason of the stresses imposed during use, although without undue increase in weight and at the same time providing a pleasing external appearance; and to provide a case having provision for securing it to a support without resort to the usual radial attaching flange.

Other and further objects and advantages of the invention will be pointed out hereinafter in the following more detailed description and by reference to the accompanying drawings, wherein:

Fig. 1 is a front elevation of a pressure gauge embodying certain features of the present invention, a portion of the transparent front panel being broken away;

Fig. 2 is a vertical section substantially on the line 2—2 of Fig. 1;

Fig. 3 is a rear elevation of the device of Fig. 1;

Fig. 4 is a fragmentary section, to larger scale, through the forward portion of the case, the transparent panel and the retaining means therefor being omitted;

Fig. 5 is a fragmentary section substantially on the line 5—5 of Fig. 3;

Fig. 6 is a side elevation of the case;

Fig. 7 is a fragmentary section, similar to Fig. 2, but illustrating a modification;

Fig. 8 is a front elevation of a gauge of modified and preferred construction, portions of the dial and the transparent panel and the parts which hold the latter in position being broken away;

Fig. 9 is a vertical diametrical section through the gauge of Fig. 8;

Fig. 10 is a fragmentary section on substantially the same plane as Fig. 9, but to much larger scale, showing the forward portion of the gauge case;

Fig. 11 is a view similar to Fig. 10 but showing the transparent panel in place;

Fig. 12 is a fragmentary front view of the compression ring used in positioning the transparent panel;

Fig. 13 is a fragmentary section, substantially on the same plane as Fig. 9, but to larger scale, showing details of the split, panel retaining ring at the point where its ends abut;

Fig. 14 is a fragmentary front elevation of the parts shown in Fig. 13; and

Fig. 15 is a perspective view illustrating a compression ring of a modified and preferred form.

The gauge case disclosed in the drawings is designed to be molded as an integral unitary structure from a suitable plastic material, for example one of the synthetic resins, a cellulose derivative or a rubber compound, and is shown as comprising the rear wall 1 and the side wall 2. The case, as here illustrated, is of substantially circular contour in front elevation, although it is to be understood that the invention is not limited to a case of this particular contour.

As shown in Fig. 2, the case increases in diameter from its front edge 3 to a point spaced a short distance forward of its rear face 4 so that the external surface 5 of the forward, main part of the case is substantially that of a truncated cone, the exterior surface 5 flaring rearwardly from the front edge 3 and being substantially smooth and devoid of any appreciable projections or other protuberances. The rear portion of the case, between the point 2ᵇ and the rear face 4 is substantially cylindrical, but the cylindrical and conical surfaces preferably merge in a smooth curve (Fig. 5).

As here illustrated the inner surface 6 of the side wall of the case is of substantially cylindrical contour, being of approximately the same diameter throughout the main part of the case and thus providing a substantially cylindrical chamber for the reception of the operating mechanism. As here illustrated, the lower part of the wall of the case is furnished with an aperture 7 to accommodate the socket 8 by means of which the gauge is connected to the pressure supply pipe. Obviously, the socket may be arranged to enter an opening in the rear wall 1, instead of the side wall, in accordance with a usual practice. As illustrated herein, the lower part of the case in which the aperture 7 is formed is flattened or slabbed off as shown at 7ᵃ, but this is not an essential or necessary feature.

The movement frame 9 is secured within the case by means of screws 10 and supports the Bourdon tube 11 which, in the usual manner, by means of gauge movement mechanism, operates the index or pointer staff 12, upon the forward end of which is mounted the index or pointer 13. The movement frame also comprises posts 14 and, as here illustrated, a bracket 15 fixed to and extending upwardly and forwardly from the frame 9, designed to support the graduated dial 16 in a plane substantially parallel to the plane of the front edge 3 of the case. The dial is thus supported independently of the case so that distortion or displacement of the case does not affect the position of the dial.

The inner surface of the forward part of the side wall of the case is furnished with a circumferential recess or rabbet 17 (Fig. 4) providing a radial abutment shoulder 18 against which rests the margin of a transparent panel 20. This transparent panel is of a diameter such that its edge 19 (Fig. 2) fits snugly within the rabbet 17, the edge 19 being thus located intermediate the inner and outer surfaces of the side wall of the casing.

Forwardly of the rabbet 17, but to the rear of the front edge 3, the inner surface of the side wall of the case is furnished with a circumferential groove 21 designed to receive a split resilient retaining ring 23 (Fig. 2), this ring being split as shown at 24 (Fig. 1) to permit it to be snapped into the recess 21. When so positioned, the ring 23 engages the outer face of the transparent panel 20 and retains it in position against the shoulder 18. As shown in section in Fig. 4, the peripheral wall 21ᵃ of the groove 21 flares rearwardly so that when the resilient ring 23 has been snapped into place, it reacts against this sloping wall so as to exert rearward pressure against the panel, whether the latter be thick or thin. Preferably the inner surface of the side wall of the case, between the groove 21 and the edge 3, is made to flare forward slightly to facilitate the entry of the ring 23 into the recess 21. It will be noted that the ring 23 is of wire of such diameter that the ring, when in place, is disposed wholly within the thickness of the side wall of the case and engages only the extreme edge portion of the transparent panel 20.

With this construction the sight opening through the transparent panel is of a diameter at least as great as that of the inner surface 6 of the case and is thus obviously of as great an area as that of the dial, even though the dial be as large as may possibly be fitted within the case. Thus the entire area of the dial is free for observation, permitting the use of graduations disposed, if desired, at the extreme margin of the dial. In this way it is possible to space the graduations farther apart for a given diameter of the dial than is possible when the outer part of the dial is obscured, as it is in most prior gauges by parts of the removable cap. Thus a user might obtain the same degree of visibility by the use of a gauge of a size smaller than he customarily employed, or improved visibility when employing his accustomed size of gauge.

In order that the gauge case may not be unduly heavy, it is preferred, as illustrated in Figs. 3 and 5, to make the rear portion at least of the side wall of the case hollow. Thus, as shown in Fig. 5, the rear part of the side wall comprises the inner portion 2ᵃ which merges integrally with the rear wall 1, and the outer part 2ᶠ, which is concentric with the part 2ᵃ and which merges with the latter substantially midway the depth of the gauge to form the unitary forward portion 2 of the side wall. The parts 2ᵃ and 2ᶠ are preferably united at intervals by webs 25 (Fig. 3) to ensure the desired stiffness of construction.

The side wall of the gauge is also furnished with a plurality of rearwardly extending niches 26 having bottom walls 27 provided with apertures 28 through which screws or bolts may be passed for securing the gauge with its rear wall 1 against a suitable support. With this construction, the material through which the apertures 28 pass performs the function of the usual radial flange of gauges of the prior art, but since these portions 27 of material in which the apertures 28 are formed are quite short circumferentially, and are integral on three sides at least with the material of the wall of the gauge, they afford ample strength for holding the retaining bolts or screws without danger of cracking or breaking out even though the gauge case be made of one of the plastic materials above described. Moreover, since the surfaces 27 are within the boundaries of the case proper and form the bottoms of the niches 26, the bolt heads are very inconspicuous (even though not wholly concealed) and do not appreciably detract from the appearance of the gauge when in place.

While in Figs. 2 and 9 the transparent panel 20 has been shown as a flat plain panel, it is contemplated that a panel of concavo-convex form may be employed if desired. Such an arrangement is illustrated in Fig. 7 by way of example where the concavo-convex panel 20a has its edges held against an abutment shoulder by a snap ring 23. By such an arrangement as that of Fig. 7 it is posssible to decrease the front-to-rear depth of the case substantially since it becomes practical to put the dial very close to the front of the case and to locate the index or pointer within the concavity of the transparent panel 20a. Thus an even wider angle of vision for viewing the dial is provided, since the margin of the dial is not obscured by the side wall of the case even though viewed from a point substantially out of line with the axis of the index staff 12.

In the modified and preferred construction illustrated in Figs. 8 to 14 inclusive, the case is in general substantially like that above described, being of such design that it may be moulded from a suitable plastic material, for instance a synthetic resin, and yet having sufficient strength and resistance to distortion to make it acceptable for its intended use. Likewise the case has a smooth exterior surface whose several parts merge smoothly with one another without appreciable projections and without sharp intersecting corners.

The case shown in Figs. 8 and 9 comprises a back wall 1m and a side wall 2m which, as here shown, is of substantially circular contour in front elevation. The inner surface 6 of the side wall of the case is of substantially cylindrical contour and defines a substantially cylindrical chamber for the reception of the operating mechanism.

As illustrated in Fig. 9, the cylindrical inner surface 6 of the side wall of the case preferably merges with a smooth curve at 6x with the interior surface of the rear wall of the case, such rear wall preferably having a forward offset 6z to which the movement frame is secured, the offset providing clearance between the upper portion of the frame and the rear wall of the case. The lower part of the side wall of the case is furnished with an aperture 7m to accommodate the socket 8 by means of which the gauge is connected to the pressure supply pipe. As herein illustrated, the lower part of the side wall of the case, at the point where the aperture 7m is located, is flattened or slabbed off, as shown at 7n (Fig. 8).

The operating mechanism is substantially identical with that illustrated in Fig. 2. The movement frame 9 is secured against the offset 6z of the rear wall of the case by means of screws 10 and supports the Bourdon tube 11, which in the usual manner operates the index or pointer staff 12, upon the forward end of which is mounted the index or pointer 13. As above described, the movement frame also comprises posts or the like to which the dial 16 is secured, the dial having a three-point support wholly independent of the case.

The inner surface of the forward part of the side wall 2m of the case is furnished with a circumferential recess or rabbet 17m (Fig. 10), having a substantially vertical or radial rear wall 18m whose outer part also forms the rear wall of a circumferential groove 30. Spaced forwardly from the groove 30 is a second circumferential groove 31 whose front wall is substantially radial or vertical. The grooves 30 and 31 are separated by a portion 33 of the side wall 2m of the case whose inner peripheral surface 33a is substantially cylindrical, and whose front-to-rear length is preferably slightly less than the thickness of any glass or other transparent panel which may be used in the front of the gauge.

Within the groove 30 is arranged a compression ring 34 (Fig. 11). This ring is made of resilient material, for example spring steel or spring brass; is preferably provided with circumferentially spaced radial slots 35 (Fig. 12) to increase its resiliency in a radial direction; and is dished so that its inner margin tends to lie in a plane forwardly of that of its outer margin. This ring is of an outer diameter substantially greater than the diameter of the surface 33a, but by reason of its resiliency may be twisted sufficiently to snap it into the groove 30, where it may remain during the life of the gauge.

Fig. 15 illustrates another and preferred form of compression ring. This ring 34a is made of resilient metal ribbon bent edgewise to circular form and having beveled ends which abut at 37b. This ring is crimped or waved transversely so that when seated in groove 30 it exerts resilient pressure against the panel 20m at spaced points.

A retaining ring 36 is normally arranged within the groove 31. This ring 36 is not necessarily as resilient as the ring 34, and as shown in Fig. 11 is substantially thicker than the ring 34, but is split at the point 37 (Fig. 14) so that its ends at the split may be slid by each other, thereby to decrease its external diameter sufficiently to enable it to be disposed in the groove 31. Preferably the outer diameter of the ring 36 is slightly greater than the outer diameter of the groove 31 so that in order to abut the ends of the ring 36 after it has been put in place, it is necessary to impart substantial tension to the ring, thus tending to buckle it slightly out of a plane. Preferably end portions of the ring 36, adjacent to the split 37, are turned forwardly to provide lugs 38 designed for engagement by a tool, for example a screw driver, to facilitate removal of the ring from the groove 31. The inner diameters of the rings 34 and 36 are preferably substantially the same as the diameter of the dial 16 so that when the rings 34 and 36 are in place, substantially all of the dial is exposed to view. Thus the entire surface of the dial is available for the reception of graduations or other indicia.

The transparent panel 20m which may be of glass or other suitable material is of a diameter preferably slightly less than the diameter of the surface 33a, but is of a diameter greater than the inner diameters of the rings 34 and 36. This transparent panel 20m is disposed against the ring 34, the latter being seated in the groove 30, and then the ring 36 is snapped into the groove 31 and its ends caused to abut, the slight distortion of the ring 36 in thus causing its ends to abut tending to cause the ring 36 to bear firmly against the transparent panel. By reason of the dished shape and resilient character of the ring 34, the latter bears at all times with spring pressure against the panel 20m so as to prevent the latter from rattling and also to compensate for panels of substantially different thickness. Since the edge of the transparent panel is disposed between the rings 34 and 36, it is wholly concealed and thus any slight roughness of such edge is immaterial. Moreover, if it be desired to associate gaskets with one or both of the rings 34 and 36, the overlap of the rings about the margin of the panel permits the introduction of such gaskets without detracting from the appearance of the instrument.

It may be noted that in the devices of Figs. 2 and 9 the means for removably retaining the transparent panel in place is such as not to overlap the exterior surface of the case, nor even does it cover or require any alteration in the configuration of the forward edge 3 of the case. Thus the outer surface and the forward edge of the case may be given such shape and form as may be desired to insure a good appearance, without reference to the means for securing the transparent panel in position. Thus when, as herein illustrated, the outer surface of the case tapers forwardly with a smooth more or less conical surface terminating at the forward edge of the case, the case has a very pleasing appearance and seems smaller and less cumbersome than the usual gauge wherein the transparent panel is held in place by a bezel ring which covers the forward edge and overhangs the outer surface of the case.

While certain desirable embodiments of the invention have been illustrated by way of example, it is to be understood that the invention is not necessarily limited to these precise embodiments, but is to be regarded as broadly inclusive of any and all equivalent constructions falling within the scope of the appended claims.

We claim:

1. A moulded, non-metallic, flangeless instrument case having a truncated-conical, forwardly tapering and smooth external contour, the rear part at least of the side wall of the case comprising spaced concentric portions united at intervals by integral webs.

2. A non-metallic, flangeless instrument case having truncated-conical forwardly tapering and smooth external contour, the rear part of the side wall of the case comprising spaced concentric portions, the rear wall of the case being integral with the inner one of said concentric portions, said concentric portions of the side wall merging at a point intermediate the rear and front faces of the case to form a wall portion of single thickness.

3. A non-metallic, flangeless instrument case having a side wall which increases in thickness from front to rear, the side wall having a smooth external surface devoid of projections and having therein a fastener-receiving niche extending from front to rear and having an apertured bottom wall for the reception of a fastener.

4. A non-metallic, flangeless instrument case having a truncated and smooth conical external contour, the rear end of the case being of greater diameter than the front, the interior of the case being of substantially uniform transverse dimensions from front to rear and the wall thickness increasing rearwardly, the wall having therein rearwardly extending niches in its outer surface for the reception of attaching elements, said niches having apertured rear end walls.

5. A unitary, moulded instrument case whose exterior surface tapers forwardly from a point near its back wall to its forward edge, the front edge of the case being thin and smoothly rounded, the side wall of the case increasing in radial thickness rearwardly from said edge and having niches in its thicker rear portion for the reception of attaching elements, the outer surface of the case being smooth and free from flanges or projections and the case having therein a substantially cylindrical chamber for the reception of the gauge movement, the thin front portion of the wall of the case having an internal recess providing for disposal of the edge of a transparent panel and of panel-retaining means in a plane behind the plane of the front edge of the case.

CARL H. GRAESSER.
FRANK H. HOPKINS.